April 4, 1939.  W. E. URSCHEL  2,152,674
MECHANICAL MOVEMENT AND CROP HARVESTER
Original Filed Dec. 30, 1935  4 Sheets-Sheet 2
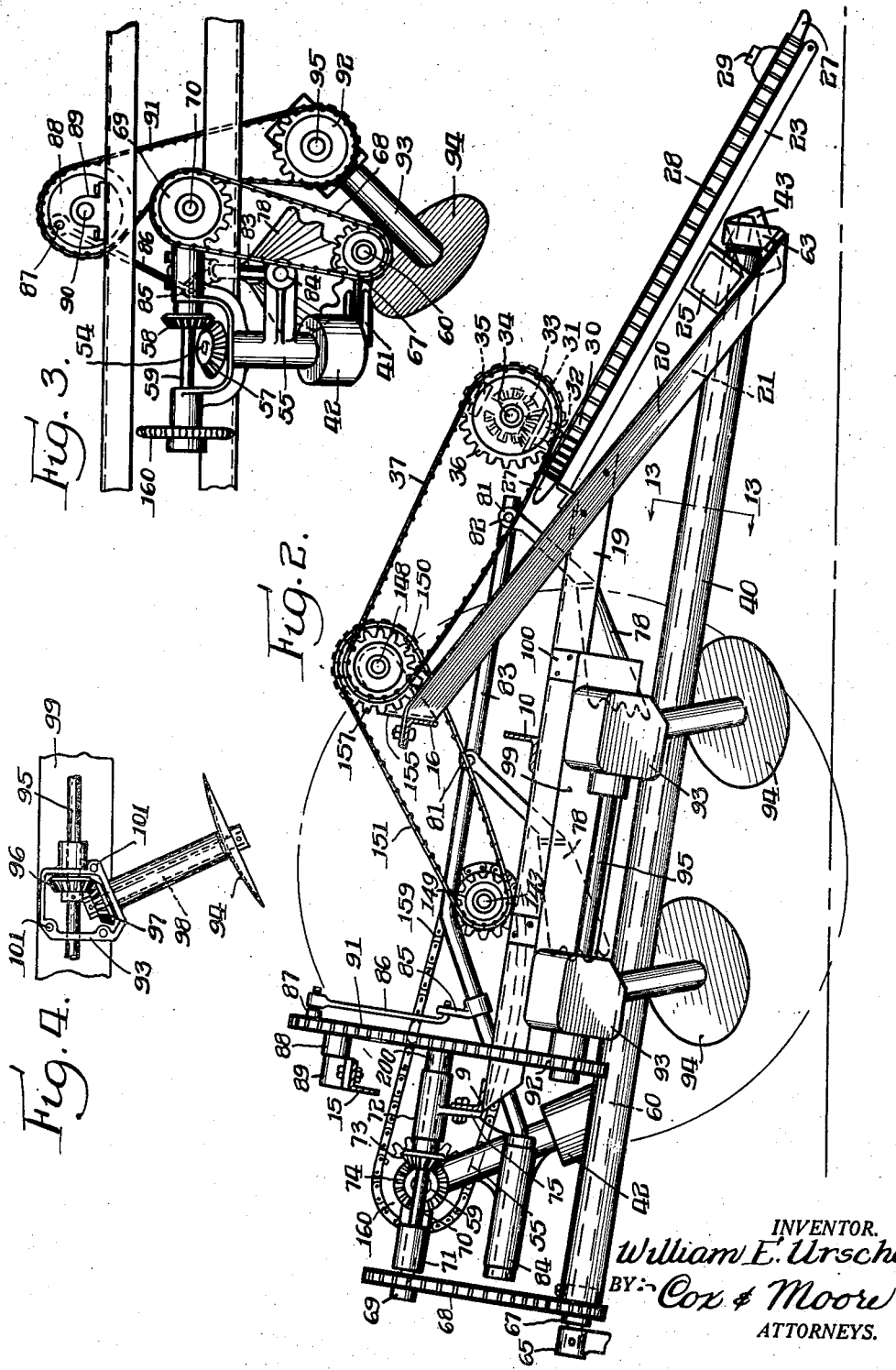
INVENTOR.
William E. Urschel
BY Cox & Moore
ATTORNEYS.

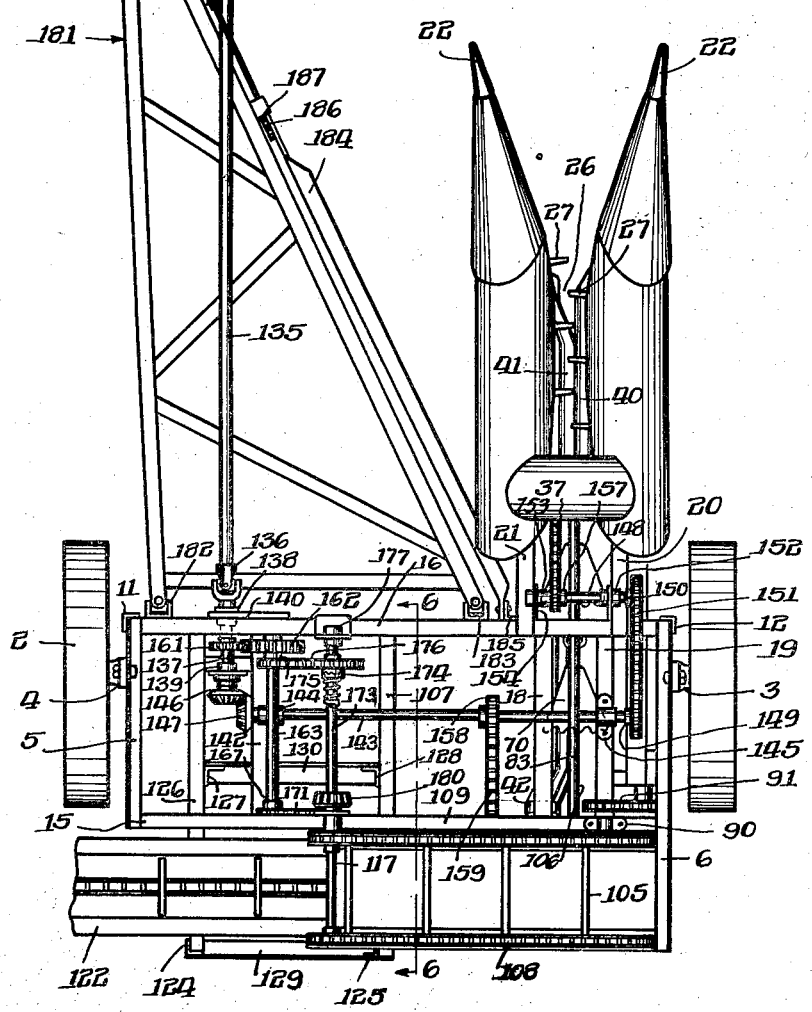

April 4, 1939.  W. E. URSCHEL  2,152,674
MECHANICAL MOVEMENT AND CROP HARVESTER
Original Filed Dec. 30, 1935   4 Sheets-Sheet 3
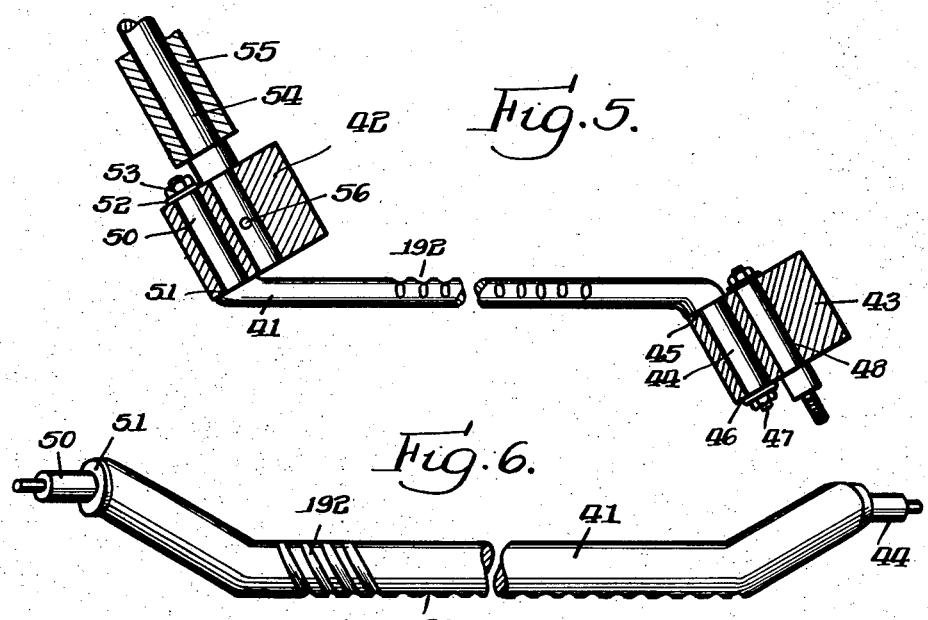
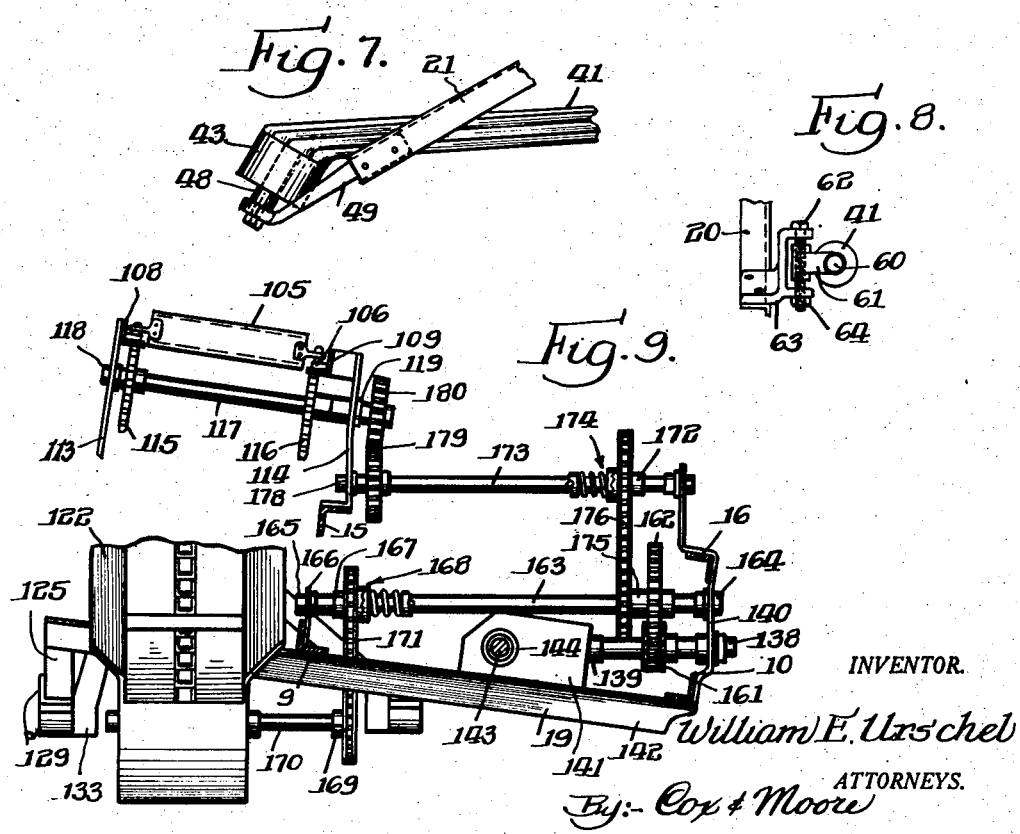
INVENTOR.
William E. Urschel
By:- Cox & Moore
ATTORNEYS.

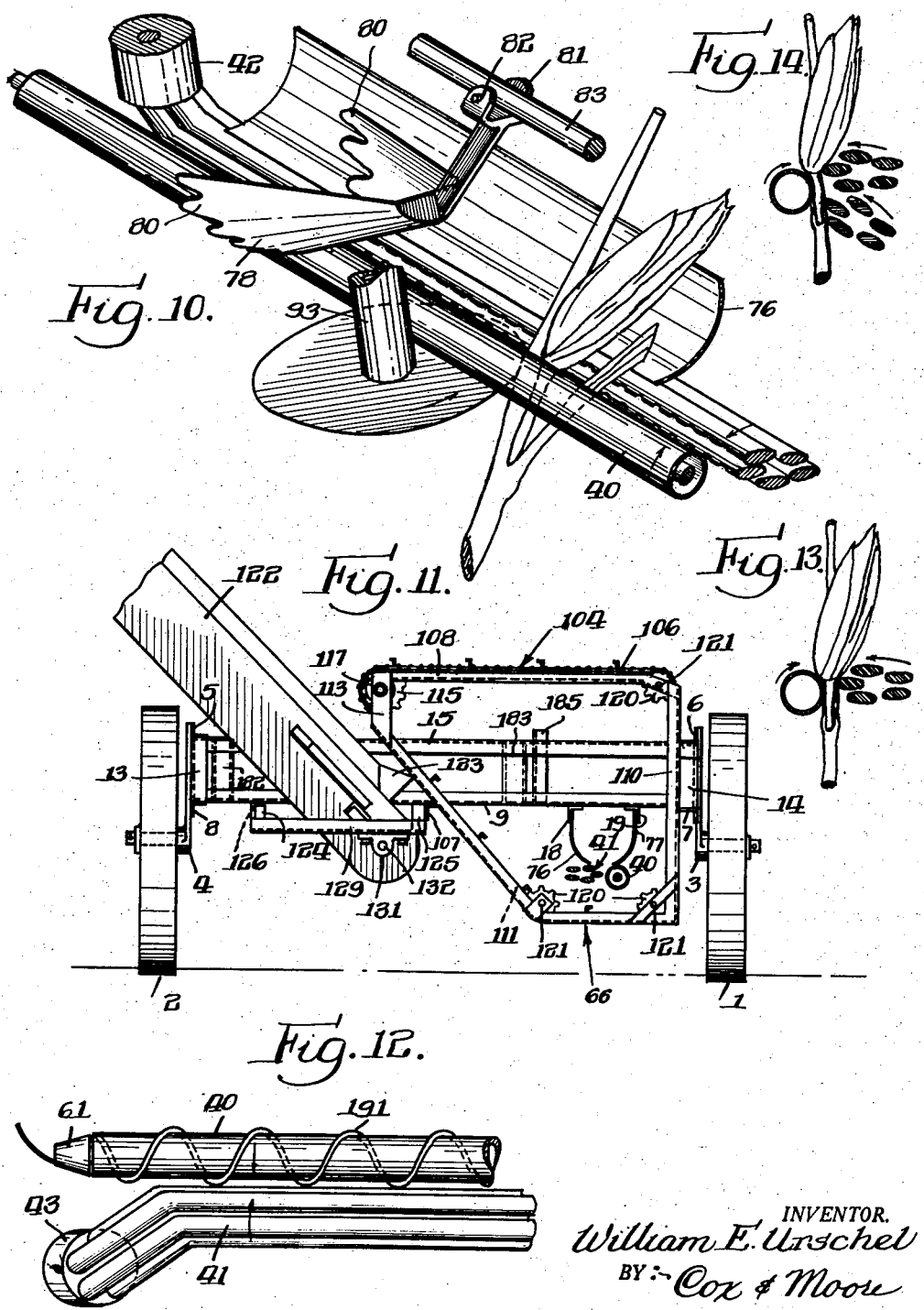

Patented Apr. 4, 1939

2,152,674

UNITED STATES PATENT OFFICE 2,152,674

MECHANICAL MOVEMENT AND CROP HARVESTER

William E. Urschel, Valparaiso, Ind.

Application December 30, 1935, Serial No. 56,747
Renewed December 8, 1937

24 Claims. (Cl. 56—103)

This invention relates to a new mechanical movement and also to a crop treating instrumentality, and particularly to a device for harvesting corn, including the harvesting of green corn.

One of the objects of my present invention is to provide a new type of mechanical movement which is particularly adapted for the harvesting of corn, including green corn, the arrangement being such that the invention will remove ears from the stalks of corn without shelling the corn from the ears and without crushing the ears when green corn is harvested.

The present invention differs from that claimed in my prior Patent No. 1,942,011, reissued on October 27, 1937, as Reissue No. 20,151, in that the present invention is restricted to a group of orbitally moving squeezing and pulling elements having roughened or notched surfaces co-operatively associating with a rotating roll, the axis of which is stationary, or with an equivalent endless belt or the like, whereby a more gentle squeezing action upon the corn stalk is provided for not only separating the ear from the stalk in such a manner as to not injure the ear or shell the corn therefrom, while at the same time feed the stalk longitudinally to a desired point. Preferably the queezing and pulling mechanism of the present invention is associated with cutting means which will co-operate to sever any of the ears which are not snapped from the stalk by the squeezing and pulling action.

In addition, the present invention comprises a distinct improvement over the construction shown in Fig. 11 of my former patent in that by using a substantially smooth roller having a spiral lead on one side of the crop and the orbitally moving squeezing elements on the opposite side, I have found that such arrangement does not injure the ears nearly as much as a construction wherein opposed groups of orbitally mov:ng members are used. Furthermore, by using knives to cut the ear from the stalk the squeezing members may be arranged to exert less squeezing action upon the ears, thereby considerably minimizing injury of the ears during the picking.

Another of the objects of the present invention is to provide a new and improved machine that may be drawn through a field of standing corn and as it is propelled will separate the ears of corn from the stalks of a row of corn, leaving the stalks in the field.

Another object of the invention is to provide an improved corn-picking machine capable of being drawn through a field of standing corn and wherein means is provided for feeding the corn stalks between an opposed picking roller and a group of circularly moving stalk squeezing elements adapted by the synchronizing associated motion, not only to draw the stalk downwardly but longitudinally of the machine, and wherein the machine is provided with one or more guiding means for moving a broken stalk into position between the picking units until it is pulled down therebetween, either in position to be discharged from the machine or to have the cutting means operate to cut the ear from the stalk.

Another object of my invention is to provide a machine having a picking chamber associated with means for feeding corn stalks to cutting means in combination with deflectors or guides which automatically shift to permit the passage of an ear of corn thereby, but which will likewise serve to position broken portions of stalk in a position to be engaged by the feeding elements.

Yet another object of my invention resides in providing a crop-feeding instrumentality which includes opposed slightly spaced apart elements, one comprising a rotating roll or the like adapted to impart a downward feed to the crop in combination therewith of an associated group of squeezing and feeding elements, which partake of a combined movement relatively toward and from the rotary roll and in a direction to co-operate to pull the crop downwardly therebetween, and in addition to provide a motion component to feed the crop in a direction longitudinally of the roll in a position to be acted upon by a cutting mechanism for cutting the crop.

To provide a commercial machine adapted to be propelled through a field of standing crop for feeding the upstanding crops to stripping members, which feed portions of the standing crop in a rather delicate manner to cutting mechanism which severs the same from the standing crop and feeds the severed portions to a desired point on the machine; to provide pulling and feeding mechanism arranged to pull corn stalks therethrough and to feed the same longitudinally thereof for the purpose of snapping or separating the ears from the stalk and additionally to feed the stalks through cutting mechanism arranged to cut those ears from the stalk which are not snapped or separated therefrom by means of the snapping and pulling mechanism.

These and other objects will be apparent from a perusal of the following specification, when taken in connection with the accompanying drawings, wherein Fig. 1 is a plan view of my improved machine.

Fig. 2 is a side elevation thereof showing the guards and guides and rear elevator removed more clearly to illustrate the various structural features thereof.

Fig. 3 is a rear view of the so-called pinch bar and roller drive and a fragment of the frame.

Fig. 4 is a side elevation of the knife holder and its drive.

Fig. 5 is a view of one of the so-called pinch bars and its bearing heads, the former being shown in elevation and the latter in section.

Fig. 6 is an enlarged plan view of one of the pinch bars shown in Figs. 1 and 2.

Fig. 7 is a side elevation of the holder for the forward pinch bar head.

Fig. 8 is a front view of the adjustable holder for the forward holder support.

Fig. 9 is a vertical section of the main drive on line 6—6 of Fig. 1.

Fig. 10 is a perspective of a portion of the pinch bars and roller, and co-operating units, parts being broken away to illustrate the details.

Fig. 11 is a rear elevation of the main frame and conveyors.

Fig. 12 is a plan view of a portion of the pinch bar roller which has a spiral lead added thereto.

Fig. 13 is a cross-section of the pinch bars and roller taken on line 13—13 of Fig. 2.

Fig. 14 is a cross-section of the roller in combination with two sets of pinch bars, the same being a modification of the construction shown in Fig. 13.

Referring now to the drawings in detail, Figs. 1, 2, 3 and 11 illustrate a machine having a main frame disposed to travel along the ground on supporting wheels 1 and 2, such wheels being rotatably mounted on axles 3 and 4, bolted to longitudinal frame members 5, 6, 7 and 8. A lower rear transverse frame member 9 and a similar front transverse member 10 are secured at their extremities to the longitudinal members 7 and 8 in any conventional manner. Corner uprights 11, 12, 13 and 14 are secured at their lower ends to members 9 and 10, and serve as supports for upper transverse members 15 and 16. The extremities of these two latter members are connected by members 5 and 6 whereby to provide a rigid box-like frame.

Longitudinal members 18 and 19 are secured to lower transverse members 9 and 10 and at their ends support parallel downwardly sloping longitudinally disposed members 20 and 21 which they engage intermediate therein. These members 20 and 21 are also secured at their upper ends to transverse member 16.

Floatingly mounted gatherer points are provided and are mounted to float over the irregular contours of the ground to pick up any stalks that may be broken or lie on the ground. To this end gatherer points 22, see Fig. 1, are pivotally mounted upon the lower ends of gatherer boards 23 by means of suitable pins. These gatherer boards 23 are in turn mounted on the longitudinal sloping members 20 and 21. Blocks or spacers 25 secured to the longitudinal members and gatherer boards hold the gatherer boards at the proper slope. The gatherer points 22 are flared upwardly at their rearmost ends. The gatherer points 22 serve to guide the corn stalks into throat 26 where the stalks are contacted by fingers 27 of gatherer chains 28. The lower ends of the gatherer chains 28 idle on sprockets 29 secured in any conventional manner to the lower ends of the gatherer boards 23 and the chains are driven by sprockets 30 secured to the hub of bevel gears 31, rotatably mounted on shafts 32.

These gatherer chains 28 may be guided in predetermined paths along gatherer boards 23 by means of hard wooden guides bolted to said boards. These gatherer guides are omitted for purposes of clarity and illustration. The driving means for the right and left gatherer chains 28 are alike. Bevel gears 33 are pinned to the extremities of a transverse shaft 34, suitably journalled in a bracket 35. Upon said shaft 34 is also mounted in any conventional manner, a sprocket 36 having a chain 37 thereabout to impart rotative movement to the shaft 34, which in turn imparts movement to shaft 32 by intermediate gears 31 and 33.

In order to guide corn stalks in position to be acted upon by gatherer chains 28, I provide curved guide plates to guide the stalks to the chains and the chains in turn guide the stalks between the picking units.

The picking mechanism comprises one or more groups of stalk contacting elements which travel in a closed circular path and co-operate with a roller, the construction being such that the stalk is received between the one or more groups of orbitally moving picking elements and the roller. In particular, the picking unit comprises a roller 40 and an oppositely disposed set of circularly moving pinching or squeezing and pulling elements herein shown as bars 41, see Figs. 1 and 11.

Referring more particularly to Figs. 2, 3 and 5, it will be seen that the squeezing and pulling bars 41 are driven by relative movement of upper bar head 42 and idle in a lower bearing head 43. The lower end of bars 41 have extensions 44 journalled in bearing head 43 and positioned by shoulders 45, washers 46 and nuts 47. The bearing heads 43 are journalled in a stud 48 secured on a bracket 49, which bracket is bolted to the longitudinal frame member 21, thus supporting the forward end of the squeezing and pulling elements.

The rear end of each squeezing and pulling bar 41 has an extended obliquely mounted pin section or bearing 50, see Fig. 5, which is journalled in a bearing head 42 and positioned by a shoulder 51, a washer 52 and nut 53. The bearing head is secured to the lower end of drive shaft 54 by a pin 56. Shaft 54 is journalled in a housing 55 and is driven by bevel gear 57, see Fig. 3, which is fixed to the upper extremity of shaft 54. Bevel gear 58 is secured to transverse shaft 59 which imparts rotative movement to bevel gear 57, thus to drive shaft 54. The roller 40 is mounted oppositely and approximately parallel to the so-called pinch bars or squeezing and pulling elements 41. This roller is rotatably mounted on a stationary shaft 60, the forward extremity of which is fixed in bracket 61, see Fig. 8. Bracket 61 is mounted on an adjusting screw 62, journalled in a bracket 63, whereby to provide a means of adjusting the height of roller 40 in respect to the pinch bars 41. This provides means to compensate for the various conditions of the crop and weather. Bracket 63 is bolted to the frame member 20. If desired, the bolt holes in frame member 20 may be in the form of slots in order to provide means for adjusting the space between roller and pinch bars 41 to suit the size of the ear. The rear end of shaft 60 is fixed in bracket 65 mounted on conveyor frame 66.

A sprocket 67 securely fastened to roller 40 is driven by sprocket 69 through chain 68, see Fig. 3. Sprocket 69 is secured to the rearmost extremity of the longitudinal shaft 70, the latter being journalled in bearings 71 and 72. These bearings are a part of the housing 55. Upon shaft 70 is also mounted a bevel gear 73, which meshes with the bevel gear 74 pinned or otherwise fastened to transverse shaft 59, by which rotary movement is imparted to shaft 70 through intermediate gears 73 and 74. An extension 75 in housing 55 is bolted to transverse frame member 9, see Fig. 2, thus securing the pinch bar mechanism to the main frame.

A picking chamber, see Fig. 11, is positioned over the picking unit and comprises two curved side members 76 and 77 bolted or riveted to longitudinal members 18 and 19. These side members form a trough which guides the stalks to the picking unit and also guides the picked ears into a conveyor, see Figs. 10 and 11. Mounted in the picking chamber are two identical shakers 78, Figs. 2 and 10, the lower and rearward edges of which are notched to form fingers 80. These shakers taper forwardly and terminate in a clevis 81. Pins 82, fastened in clevis 81 hinge the shakers to a crank 83. By means of this construction the shakers rise up over an ear of corn and permit its passage through the picking chamber. The fingers of the shakers directly guide and laterally move a plurality of stalks over the picking units until the stalks are pulled down and out of the chamber. Crank 83 is mounted in a bearing 84, integral with housing 55. A projection 85 on this crank 83 forms a bearing for a connecting rod 86, which in turn is mounted on eccentric pin 87. This pin 87 is integral with the sprocket 88 rotatably mounted on a shaft 90 secured in a bracket 89, see Fig. 3. This bracket is bolted to transverse frame member 15. A sprocket 200 is keyed to the shaft 70 and is connected to sprocket 88 through chain 91.

To cut the ears of corn from the stalk two rotary knives 94, see Fig. 4, are mounted at the side of the picking unit and are so located that the cutting edge of the knives will project under the picking unit. These knives 94 are pinned to shafts 98, the latter being journalled in housings 93, see Figs. 2, 3 and 4. A bevel gear 97 pinned to shaft 98 is rotated by bevel gear 96, which is secured to shaft 95 which in turn is journalled in housing 93, and the shaft extends rearwardly through rearmost housing 93. By reference to Fig. 2 it will be seen that sprocket 92 is mounted upon shaft 95 and imparts rotary movement through a chain 91. Knife housings 93 are bolted to frame member 99 and brackets 100 are secured to frame member 99 and bolted to longitudinal frame member 19, thus securing a knife mechanism to the main frame.

Conveying means 104, Figs. 1 and 11, is positioned transversely of the frame behind the discharge end of the picking unit for the purpose of receiving the ears of corn. This conveyor 104 is of a standard continuous chain and slat type, the slats 105 of which are riveted to projecting lugs on detachable link chains 106. The lower flights of these chains 106 are supported by transversely disposed angle members 111. The right-hand extremities of members 111 are secured to the lower ends of uprights 110 which in turn are secured to the extended portions of the main frame member 6 and 7. The left hand portions of members 111 are elevated and conventionally secured to a longitudinal member 107, bolted to main frame members 9 and 10. Additional rigidity is assured by bolting members 111 to main frame members 9 and 15. The upper flight of conveyor 104 is supported by members 108 and 109. These members are secured at their right-hand end to uprights 110. The left extremities of 108 and 109 are supported by uprights 113 and 114, see Fig. 9, and these in turn are bolted to elevated ends of members 111. Sprockets 115 and 116 are pinned to a shaft 117 journalled in boxes 118 and 119, which are suitably mounted on uprights 113 and 114. Sprockets 115 and 116 drive conveyor 104 through chains 106. Idle sprockets 120, suitably journalled on studs 121, serve to guide chain 106 in a predetermined path. Side members 111 serve to retain the picked ears in conveyor 104 while the sheet member secured to members 111 forms the bottom section.

Picked ears of corn carried from the picking chamber by conveyor 104 are deposited into a standard wagon elevator 122, see Fig. 11, by means of a chute 123. The support for the wagon elevator 122 comprises two short vertically extending rear uprights 124 and 125, and two vertically extending forward uprights 127 and 128 bolted to longitudinal frame members 126 and 107, see Fig. 1. A transverse support 129 is bolted to the lower ends of members 124 and 125 and a transverse support 130 is bolted to the lower ends of members 127 and 128. Brackets 131 are bolted to members 129 and 130 and have circular apertures to receive pins 132 that are riveted to angle supports 133. These angle supports are conventionally secured to side members of wagon elevator 122, thus providing a support for the unit. Uprights, not shown, may be used to hold the elevator 122 rigidly.

A power take-off 135, see Fig. 1, of standard construction and having a splined female connection not shown is adapted to co-operate with a take off shaft of a tractor, thus providing means by which the device is propelled across the ground. A universal joint 136 flexibly connects the power take-off shaft 135 to drive shaft 137 journalled in bearing boxes 138 and 139, see Fig. 9. Bearing box 138 is mounted in an upright plate 140 bolted to frame members 10 and 16. Bearing box 139 is suitably mounted in a bearing bracket 141 bolted to a frame member 142. One extremity of a transverse shaft 143 is journalled in box 144 suitably mounted in bracket 141, while the other end of said shaft is journalled in a bracket 145, see Fig. 1, which in turn is bolted to longitudinal member 19. A bevel pinion 146 pinned to shaft 137 drives a bevel gear 147 pinned to shaft 143. A gatherer chain drive shaft 148 is driven by shaft 143 through sprocket 149 on shaft 143 and 150 on shaft 148 and a chain 151 about said sprockets. Shaft 148 is journalled in boxes 152 and 153 mounted in plates 154 and 155 which are bolted to members 20 and 21. Sprocket 157 drives the gatherer chain drive sprocket 36, see Fig. 2, through chain 37. A sprocket 158, see Fig. 1, is pinned to shaft 143 and drives the pinch bar drive sprocket 160, see Fig. 2, through a drive chain 159. A pinion 161 also is pinned to shaft 137, see Fig. 9, and drives a spur gear 162 pinned to a shaft 163 which is journalled in bearing boxes 164 and 165. Box 164 is mounted in an upright plate 140 while box 165 is mounted in plate 166 bolted to frame member 9. A sprocket 167 is rotatably mounted on shaft 163 and is driven by said shaft through a safety clutch 168 of conventional design for protecting the drive from overloading. A sprocket 169 is driven by sprocket 167 through chain 171, thereby providing means for driving elevator 122. A sprocket 172 is rotatably mounted on shaft 173 and drives said shaft through a safety clutch 174. Power for shaft 173 is transmitted by sprockets 172 and 175 and chain 176. Shaft 173 is journalled in boxes 177 and 178 mounted on members 140 and 114. A pinion 179 pinned to shaft 173 drives gear 180 pinned to the drive shaft 117 of conveyor 104. A draw bar 181, see Fig. 1, of standard design is conventionally secured to journalled members 182 and 183 bolted to transverse frame members 16 and 10. A turning lever 184 is bolted to an angle member 185, which is secured to the main frame members 10 and 16. A detent 187 on lever 184 co-operates with the means at 186 bolted to draw bar 181, whereby the lever 184 serves to tilt and maintain the frame of the machine at a predetermined angle with the ground line. The tractor is coupled to the draw bar 181 and the tractor power take-off is connected to the power shaft 135. When the machine is pulled down a row of corn in such a manner that the points 22 are on each side of the row, as the machine advances, stalks of corn are guided towards throat 26 by co-operation of the points 22 and the guides. Fingers 27 of the gatherer chains 28 urge the stalks rearwardly until they are well engaged by and between the squeezing and pulling bars and the roller. The direction of rotation of the squeezing and pulling elements is shown in Fig. 13. The stocks are squeezed and pulled between the smooth roller 40 and the squeezing and pulling bars 41, the action drawing the stalk downwardly and simultaneously rearwardly longitudinally of the roller and elements 41. The roller draws the stalk downwardly while the pinch bars impart rearward motion to the stalks along with the downward motion. The stalks slide rearwardly on the smooth roller while the pinching and pulling bars urge the stalks rearwardly. Notches 190 in the edges of the pinch bars 41 are adapted to engage the stalks and by pinching the stalks in the notches the pinch bars have a positive action on the stalks. Under certain conditions a spiral lead 191, see Fig. 12, may be added to the smooth roller 40 to assist the pinch bars drawing the stalks rearwardly. As the machine advances the stalks are drawn downwardly and rearwardly until the butt end of the stalks are against the roller and pinch bars, as shown in Fig. 13. An ear of corn is fastened to the stalk by a stem which is about one-half the length of the ear and as the kernels of green corn are tender the ears must not be handled roughly. When the butt ends come in contact with the stalks the ears will be pinched off and the rear end will slide until the stem of the ear which projects below the picking unit comes in contact with the smaller knife and is separated from the stalk. Shaker 78 having the fingers 80 is adapted to move back and forth across the picking unit. These fingers hook on any loose stalks and rake the stalks down into the space between the roller and pinch bars, whereby the stalks are drawn from the picking chamber.

Picked ears progress rearwardly and are deposited upon the conveyor 104. Notches 192 in the pinch bars 41 are useful in aiding the progress of the ears through the machine. Picked ears deposited upon conveyor 104 are urged transversely to the left side of the machine then move upwardly and are deposited in chute 123, which guides them into wagon elevator 122. Elevator 122 then deposits picked ears in a wagon which may be conventionally attached alongside of the machine or the picked ears may be deposited into a tank or other receptacle on the machine.

In connection with the modification shown in Fig. 14, it will be noted that the upper group of pinch bar elements 41 assist in association with the rotatable roller in pulling the stalks downwardly so as to feed the ears of corn and attached stems inwardly between the roll and the lower group of pinch bars, whereby a more effective severance of the ear from its stalk is secured. In this construction the lower or second group of so-called pinch bars is positioned a little more closely to the roller than is the upper set of pinch bars. The upper set are spaced sufficiently from the rollers so that in their circular movement they will gently feed the corn stalks to the space between the roller and the second group of pinch bars which, being more closely rotated to the roller in their closed path of movement, serve to effect the snapping action of the ears from the stalk. Suitable means is obviously provided for adjusting one or both of these groups of pinch bars relatively to the roller or alternatively the roller may be provided with any type of adjustable mounting. However, it is preferred to provide independent adjustments for each of the groups of pinch bars to provide the function above set forth.

Changes may be made in the form, construction and arrangement of parts without departing from the spirit of the invention or sacrificing any of its advantages, and the right is hereby reserved to make all such changes as fairly fall within the scope of the following claims.

Having thus described my invention, what I claim as new and desire to secure by Letters Patent is:

1. Crop treating apparatus comprising an elongated roll rotatable about its own axis and opposed rotatable heads disposed in axially offset relationship, a plurality of elongated bars having their opposite ends connected to one of each of the opposed heads, the points of connection being disposed concentrically about the axes of rotation of the heads, said elongated bars each having a roughened surface and extending in parallel relation between said heads and parallel to the roll, and means for rotating at least one of said heads to cause said bars to travel in spaced relation in the same circular path toward and from said rotatable roll.

2. Crop treating instrumentalities comprising an abutment having a surface adapted to travel in a substantially arcuate path in a clockwise direction, means forming a plurality of crop contacting surfaces disposed to provide a plurality of spaced-apart elongated members extending parallel to the arcuately moving abutment, means for causing said spaced-apart members to travel in the same circular path in a counterclockwise direction to approach relatively close to the path of travel of the arcuately disposed member and to recede therefrom, said means also causing relative longitudinal movement between said abutment and said spaced-apart members, and spaced guides in juxtaposition to said abutment and said members for receiving the fruit of the crop from said members.

3. In combination means providing an elongated cylinder, means to rotate said roll, a group of elongated non-rotary elements, means for causing said elongated members to travel in the same circular path toward and from said cylinder, means for synchronously moving said roll and elements to cause them to grip and pull downwardly crops disposed between said cylinder and group of elements and crop gathering means for causing movement of the crops longitudinally of, and into engagement with, said cylinder and elements.

4. In a corn harvesting machine the combination of means forming a vehicle adapted to travel over the ground, opposed deflectors mounted on said vehicle to receive therebetween upstanding corn stalks carrying ears of corn thereon, means between said deflectors for positioning opposed stripping elements in relation to said deflectors to receive therebetween said corn stalks, one of said stripping elements comprising a rotatably mounted roll, means for rotating said roll, the other of said stripping elements comprising a group of elongated bars mounted to move in spaced relation in the same closed path toward and from said roll, said bars being disposed parallel to the longitudinal axis of said roll and in their movement approaching and receding from said roll, and means for moving said roll and said bars whereby to cause stalks fed therebetween to be pulled downwardly and to move rearwardly along and between said roll and bars whereby to cause the stripping of ears of corn from said stalks.

5. Crop treating instrumentality comprising means forming a substantially elongated, substantially rigid feeding surface, means for causing said feeding surface to travel in an arcuate path in a direction substantially transversely of its length, means providing a group of squeezing and feeding members each having a roughened surface, said members being elongated in a direction parallel with the length of said first mentioned feeding surface, said members being spaced apart, and means for moving said members in a direction to cause them to approach toward and move arcuately with the arcuate path of travel of said first mentioned feeding member and likewise to move in a direction longitudinally of the first mentioned feeding member whereby crops disposed between said members will be fed between and through said members and will likewise be fed longitudinally of said members and cutting means disposed in the path of travel of the crop so fed for severing the same.

6. A crop treating instrumentality comprising in combination a support, an elongated rotatable roller having a substantially smooth peripheral surface, means for rotating said roller and a plurality of spaced-apart elongated bars disposed in parallel relation to said roller, means for moving said bars in the same circular path toward and from said roller while imparting a substantially longitudinal movement to each of said members substantially longitudinally with respect to the roller, said bars being held from rotation about their own axes and each being provided with a roughened surface adapted to be presented substantially close to the surface of said roller during the approaching movement of said bars toward said roller.

7. Crop treating instrumentalities comprising an elongated rotatable roller having a helically disposed cleaning surface on its periphery and an opposed group of elongated bars disposed parallel to said roller in spaced-apart relation and means for moving said bars in the same closed path toward and from said roller while imparting a movement to each of said bars in a direction substantially longitudinally of the roller, means for holding said bars from rotation about their own axes while moving in said closed path, said bars having portions facing said roller provided with gripping means.

8. In a crop treating instrumentality the combination of a substantially elongated rotating roller and two sets of elongated crop gripping members disposed in opposed relation to said roller, the members of each set being spaced apart and the two sets being spaced apart from each other and from said roller to receive crops between said members and said roller, and means for imparting to respective members of each set a circular movement toward and from said roller, said groups of members and said roller being arranged so that the crop is fed in a direction first between said roller and one group of members and then between the roller and the second group of members and means for imparting to each of said members in its circular movement a motion substantially longitudinally of the roller.

9. In a picking device for removing corn from corn stalks, the combination of a support having a picking chamber including at its bottom opposed picking members, one comprising an elongated rotatable roller and the other comprising a set of elongated spaced apart bars disposed parallel to the roller, means for moving the bars in the same closed path toward and from the roller and for imparting to the bars a movement longitudinally of the roller, guide members associated with said picking members, cutting means disposed so as to cut corn from a corn stalk pulled downwardly and rearwardly between said picking members, and stalk deflecting means movably mounted above said opposed picking members and adapted to move freely upwardly to permit the passage of a cob of corn therebeneath, said means having means disposed to feed a broken stalk into position between the two picking members.

10. Crop gathering apparatus comprising an abutment surface, a series of spaced-apart elements having edges generally parallel to said abutment surface, means to move said elements in a closed path toward and away from said abutment surface, means to maintain said spaced-apart elements in substantially the same angular relationship in space during movement toward and away from said abutment surface, and spaced members overlying said surface and said elements and forming a picking chamber to receive the fruit of the crop.

11. Crop treating instrumentalities comprising a longitudinally extending abutment surface, a series of spaced-apart grasping elements having edges generally parallel to said abutment surface, means to move said elements in the same closed revolutionary path toward and away from said abutment surface, means to maintain said spaced-apart elements in substantially the same angular relationship in space during a major portion of the movement toward and away from said abutment surface, and each of said spaced-apart elements having a roughened surface adapted to be presented substantially close to said abutment surface during the approaching movement of said elements.

12. Crop gathering apparatus comprising a longitudinally extending abutment member, an elongated spaced-apart series of elements, means to continuously move said elongated elements in a closed revolutionary path toward and away from said abutment member to engage crop material therebetween, means to cause said elongated elements to present the same face toward the abutment member during substantially the entire path of revolution and spaced conveyor means carrying overlapping fingers for feeding the crop to and between said abutment surface and said elements.

13. A crop treating apparatus comprising a longitudinally extending abutment member having a longitudinally extending surface adapted to travel in an arcuate path, a series of elongated spaced-apart elements generally parallel to said abutment member, means to continuously move said elongated elements in a closed path toward and away from and longitudinally relative to said abutment member to engage crop material therebetween, and means to maintain the elongated elements in such angular relationship that substantially the same edge is presented toward the abutment member during the path of revolution, the edge of each element which is presented toward the abutment member being roughened to facilitate the longitudinal movement of the crop with said element.

14. A crop gathering apparatus comprising an elongated roll mounted for rotation about its longitudinal axis, elongated spaced-apart parallel bars arranged generally parallel to said roll and each having a notched edge, means to continuously move said elongated elements in a closed path toward and away from said roll to engage crop material therebetween, and means to maintain said elongated bars in such angular relationship during their travel in said path as to continuously present the notched edge toward the roll.

15. A crop treating apparatus comprising an elongated abutment member, a pair of opposed rotatable heads disposed in offset axial relationship, a plurality of elongated bars supported adjacent the ends thereof by said rotatable heads, and having roughened surfaces, said bars being generally parallel to said abutment member, and means to rotate said heads whereby to move said bars in a closed path toward and away from said abutment member.

16. A crop treating apparatus comprising an elongated rotatable abutment member having a spiral lead, a pair of opposed rotatable heads disposed in offset axial relationship and having parallel axes which are angularly disposed with respect to the longitudinal axes of the abutment member, a plurality of elongated bars rotatably supported adjacent the ends thereof by said rotatable heads, said bars being arranged generally parallel to said abutment member, and means to rotate said heads whereby to rotate said bars in a closed path wherein the bars move toward and away from said abutment member and at the same time reciprocate longitudinally thereof.

17. In a crop treating apparatus comprising a longitudinally extending abutment member, a series of elongated spaced-apart elements, supporting means for said elements, means to move said elements in a closed revolutionary path toward and away from said abutment member, said last mentioned means also moving said elements longitudinally with respect to said supporting means and inclined crop-gathering means above said member and said elements and extending forwardly therebeyond for feeding the crop to and between said member and said elements.

18. A crop treating apparatus comprising a rotatable cylinder forming a longitudinally extending abutment member and having a spiral lead, and elongated series of spaced-apart elements generally parallel to said abutment member, supporting means for said elements, and means to move said elements in the same closed path having a revolutionary component in a path toward and away from said abutment member and a second component longitudinally of said supporting means.

19. A crop treating apparatus comprising an elongated rotatable abutment member, an elongated series of spaced-apart elements generally parallel to said abutment member, supporting means for said elements, means to move said elements in a closed revolutionary path toward and away from said abutment member, and means to cause relative longitudinal movement at the same time between said elements with respect to the supporting member, each element being provided with a roughened surface adapted to be presented substantially close to said abutment member during approach thereto.

20. Crop gathering apparatus comprising cutting means, spaced picking members extending above said cutting means, means for rotating one of said members about its own axis, means for moving the other of said members transversely toward and from the first member and longitudinally relative to said first member, thereby to squeeze the crop therebetween and feed the same to said cutting means, whereby a desired portion of said crop is severed from an undesired portion of the same and shiftable guide means above said picking members for maintaining the crop between said members.

21. In a corn harvesting machine, the combination of means forming a vehicle adapted to travel over the ground, opposed deflectors mounted on said vehicle to receive therebetween upstanding corn stalks carrying ears of corn thereon, means for removing the ears of corn from the stalks, said means comprising an elongated, rotatable roll, a rotatable head spaced from said roll, a plurality of elongated bars each connected at one end to said head, means for rotatably supporting the other end of each of said bars, the axis of rotation of said rotatable head being angularly inclined relative to the axis of said rotatable roll, and means for rotating said rotatable head to cause said bars to move bodily toward and from said rotatable roll, and means for automatically shifting said deflectors to permit an ear of corn to pass therethrough and to position a broken stalk between said roll and said elongated bars.

22. In a corn harvesting machine, the combination of means forming a vehicle adapted to travel over the ground, opposed deflectors mounted on said vehicle to receive therebetween upstanding corn stalks carrying ears of corn thereon, means for removing the ears of corn from the stalks, said means comprising an elongated, rotatable roll, a rotatable head spaced from said roll, a plurality of elongated bars each connected at one end to said head, means for rotatably supporting the other end of each of said bars, the axis of rotation of said rotatable head being angularly inclined relative to the axis of said rotatable roll, means for rotating said rotatable roll and said rotatable head in opposite directions, the rotation of said head causing said bars to move bodily about the axis of rotation of said head toward and from said rotatable roll, and means for automatically shifting said deflectors to permit an ear of corn to pass therethrough and to position a broken stalk between said roll and said elongated bars.

23. In a corn harvesting machine, the combination of means forming a vehicle adapted to travel over the ground, opposed deflectors mounted on said vehicle to receive therebetween upstanding corn stalks carrying ears of corn thereon, means for removing the ears of corn from the stalks, said means comprising spaced picking members, means for rotating one of said members about its own axis, and means for revolving the other of said members about an axis externally thereof toward and from the first member, thereby to squeeze the corn stalk therebetween and strip an ear of corn from the stalk, and means for automatically shifting said deflectors to permit an ear of corn to pass therethrough and to position a broken stalk between said picking members.

24. In a corn harvesting machine, the combination of means forming a vehicle adapted to travel over the ground, opposed deflectors mounted on said vehicle to receive therebetween upstanding corn stalks carrying ears of corn thereon, means for removing the corn from the stalks, said means comprising cutting members, means for rotating one of said members about its own axis, means for moving the other of said members transversely toward and from the first member and longitudinally relative to said first member, thereby to squeeze the corn stalk therebetween and feed the same to said cutting means, whereby an ear of corn is severed from the stalk, and means for automatically shifting said deflectors to permit an ear of corn to pass therethrough and to position a broken stalk between said cutting members.

WILLIAM E. URSCHEL.